United States Patent [19]
Kimura

[11] Patent Number: 5,153,403
[45] Date of Patent: Oct. 6, 1992

[54] PROCESS AND APPARATUS FOR THAWING FROZEN FOOD

[75] Inventor: Yoshitaka Kimura, Tokyo, Japan

[73] Assignee: Showa Denko K.K., Tokyo, Japan

[21] Appl. No.: 648,327

[22] Filed: Jan. 29, 1991

Related U.S. Application Data

[63] Continuation of Ser. No. 361,203, Jun. 5, 1989, abandoned.

[30] Foreign Application Priority Data

Jun. 6, 1988 [JP] Japan .................... 63-139134

[51] Int. Cl.$^5$ .................................... H05B 6/80
[52] U.S. Cl. .................. 219/10.55 M; 219/10.55 R; 219/10.55 B; 426/524; 426/241; 99/451; 99/DIG. 14
[58] Field of Search ......... 219/10.55 M, 10.55 A, 219/10.55 R, 10.55 B, 10.55 E, 10.55 F, 400; 165/2, 14, 30; 99/451, DIG. 14; 426/524, 241, 242, 243, 234

[56] References Cited

U.S. PATENT DOCUMENTS

| | | | |
|---|---|---|---|
| 3,470,942 | 10/1969 | Fukada et al. | 219/10.55 B |
| 3,536,129 | 10/1970 | White | 219/10.55 M |
| 3,556,817 | 1/1971 | Jeppson | 426/241 |
| 3,682,643 | 8/1972 | Foster | 426/524 X |
| 3,884,213 | 5/1975 | Smith | 219/400 X |
| 4,525,615 | 6/1985 | Wyland | 219/10.55 M |
| 4,761,529 | 8/1988 | Tsisios | 219/10.55 B |

FOREIGN PATENT DOCUMENTS

| | | |
|---|---|---|
| 54-36660 | 3/1979 | Japan . |
| 60-105478 | 6/1985 | Japan . |
| 60-759171 | 12/1985 | Japan . |

Primary Examiner—Philip H. Leung
Attorney, Agent, or Firm—Sughrue, Mion, Zinn, Macpeak & Seas

[57] ABSTRACT

A frozen food is thawed by irradiating the frozen food with far infrared rays while supplying cold air to the frozen food to maintain the surface temperature thereof at a level not higher than 10° C. Prior to the far infrared ray irradiation, the frozen food may be irradiated with a microwave. Thus, the frozen food can be uniformly thawed while maintaining freshness without degradation of the taste and favor thereof.

7 Claims, 1 Drawing Sheet

PROCESS AND APPARATUS FOR THAWING FROZEN FOOD

This is a continuation of application Ser. No. 07/361,203 filed Jun. 5, 1989, now abandoned.

BACKGROUND OF THE INVENTION

(1) Field of the Invention

The present invention relates to a process and apparatus for thawing a frozen food such as frozen meat or fish.

(2) Description of the Related Art

As the conventional thawing process, there can be mentioned (a) a process using hot air, (b) a process using microwaves, and (c) a heat radiation process. In the hot air process (a), if the temperature of hot air is too high, the surface portion of the frozen food is degenerated. Although it is considered that this disadvantage will be overcome if low-temperature air is used, a long time is required for the thawing in this case and the process is not applicable when rapid assortment or cooking is required. In the microwave process (b), the frequency that can be used at present is suitable for rotational vibration of the dipole moment of water, but this frequency is not optimal for ice and thus heat converges on the portion of water produced by thawing and the treatment effect becomes uneven. Namely, the central portion of the food remains frozen while the surface portion is boiled. In the heat radiation process (c), the thawing is effected by heat radiation from a surrounding heating plate, and far infrared radiation is especially effective. Nevertheless, this process has a problem in that the surface portion is readily deteriorated, the freshness is lost, and discoloration occurs, and a long time is required for completion of the thawing treatment.

Of the above-mentioned conventional thawing processes, the far infrared ray irradiation process is regarded as most advantageous, in that the efficiency of absorption of the far infrared ray energy is high and the energy is directly transferred to the interior of the food from the surface by heat radiation. But this process involves the problem of a loss of freshness and the long time required for completion of the thawing treatment.

The microwave process is effective for elevating the temperature of a frozen food, for example, from $-30°$ C. to about $-3°$ C. if a frequency suitable for ice can be adopted. But if the surface of the food becomes wet, a conduction electric current flows to weaken the electric field in the interior, and the surface portion is boiled because of a temperature difference between the surface portion and the interior. Therefore, it is difficult to uniformly and efficiently elevate the temperature from the frozen state at about $-3°$ C. to the thawed state above $0°$ C. As a means for overcoming this disadvantage, a process is adopted in which a frozen food is irradiated with microwaves while cooling the surface portion of the food (see, for example, Japanese Unexamined Patent Publication No. 54-36660, Japanese Unexamined Patent Publication No. 60-105478 and Japanese Unexamined Patent Publication No. 60-259171). But since the specific heat of the cooling air is low and the cooling capacity of the cooling air is readily lost by elevation of the temperature by heat received from the frozen material, it is necessary in this process to at a level lower than $-10°$ C., and heat of the entire frozen food is taken by this cooling air, resulting in a reduction of the thawing efficiency. Therefore, the size of the apparatus must be increased, and accordingly, the cost is increased, and thus this process is practically worked only as a large-scale thawing machine for industrial purposes.

SUMMARY OF THE INVENTION

The primary object of the present invention is to provide a process and apparatus by which thawing is accomplished in a shorter time than in the conventional techniques while preventing or minimizing any reduction of the quality of a food at the thawing step.

The present inventors carried out research into the thawing process using far infrared rays, with a view to realizing the above-mentioned object, and as a result found that, in a process for thawing a frozen food with a far infrared ray energy, if cold air is supplied to the frozen food to maintain the surface temperature of the frozen food below a predetermined level, the thawing can be uniformly accomplished in a short time.

More specifically, in accordance with the present invention, there is provided a process for thawing a frozen food, which comprises irradiating the frozen food with far infrared rays while supplying cold air to the frozen food to maintain the surface of the frozen food at a temperature not higher than $10°$ C.

Prior to the irradiation with far infrared rays, the frozen food can be irradiated with microwaves until the surface temperature of the frozen food is elevated to $-5°$ to $0°$ C.

Furthermore, in accordance with the present invention, there is provided an apparatus for thawing a frozen food, which comprises a thawing chamber for containing the frozen food therein, a far infrared ray heater for emitting an irradiation energy, which is disposed in the upper portion or side portion of the thawing chamber, and a cold air supply device for supplying cold air maintained at a desired temperature of at least $-30°$ C. to the surface of the frozen food.

A microwave irradiation device can be equipped together with the far infrared heater so that the frozen food is first irradiated with microwaves and then with far infrared rays.

DESCRIPTION OF THE PREFERRED EMBODIMENTS

Figure 1:
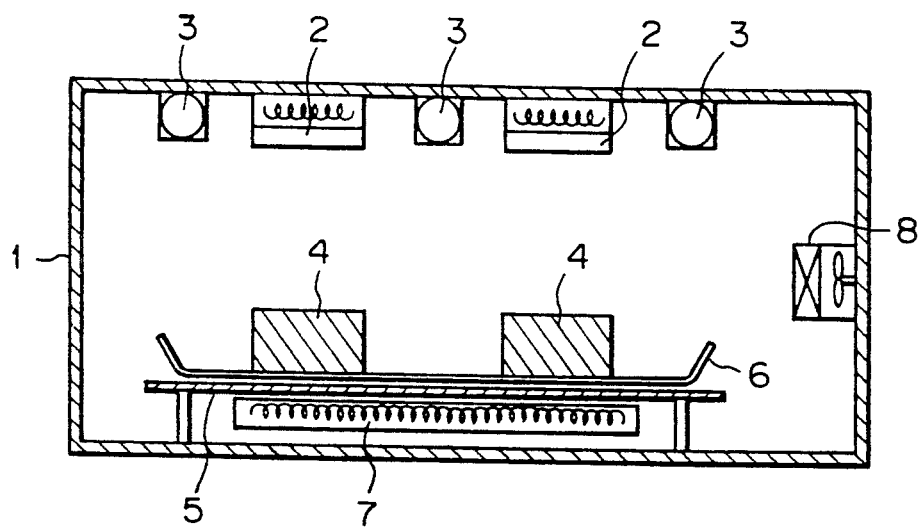
FIG. 1 is a schematic diagram illustrating the thawing apparatus of the present invention.

To increase the energy transfer during the irradiation with far infrared rays, it is sufficient to elevate the surface temperature of a far infrared ray radiator. In this case, the temperature-elevating rate in a food to be irradiated is increased, but the surface temperature of the food is elevated and thus an undesirable change in the food occurs. For this reason, in the usual thawing process, the surface temperature of the far infrared ray radiator (heater) is restricted.

In the present invention, to prevent an elevation of the surface temperature of a food to be irradiated, cold air is applied to the food. As explained hereinbefore with respect to the irradiation with microwaves, it has heretofore been considered that the far infrared ray energy is wastefully consumed by the cold air and the irradiated surface portion cooled by the cold air, and therefore, a supply of the cold air is not significant from the viewpoint of thermal efficiency.

Contrary to this expectation, according to the research made by the present inventor it has been found that, if the surface temperature is maintained at a low level by cold air, according to the principle of radiation, the driving force to a high-temperature zone from a low-temperature zone is increased to increase the inflow rate of heat, i.e., the quantity of heat transferred per unit area and unit time, and desirably, the temperature on the high-temperature side (i.e., heater side) is further elevated and the heat inflow efficiency is proportionally increased. Accordingly, it is possible and preferable to elevate the far infrared ray energy to at least 0.5 W, especially at least 0.7 W, per gram of a food to be thawed.

In the present invention, to prevent a reduction of freshness and deterioration such as discoloration of a frozen food when irradiated, the surface temperature of the frozen food is maintained at a level not higher than 10° C., preferably not higher than 6° C., by cold air. To maintain this surface temperature, preferably cold air having a temperature of −30° to 5° C. is used.

In the present invention, the frozen food can be irradiated with microwaves prior to the irradiation with far infrared rays. As pointed out hereinbefore, the irradiation with microwaves is effective before the frozen food is melted and becomes wet. Accordingly, the irradiation with microwaves can be applied prior to the irradiation with far infrared rays. At this step of the irradiation with microwaves, a supply of cold air is not absolutely necessary, but if a high uniformity is required, cold air must be supplied. The temperature at the switching point is −5° to 0° C., preferably about −3° C. Namely, the sensible heat, for example, spanning from −30° C. to −3° C. is dealt with by microwaves and the latent heat for melting the ice to water is then dealt with by far infrared rays. In the case of frozen foods, freezing is generally effected at a temperature lower than −30° C. When thawing of these frozen foods is carried out by heating, it is especially important that the foods are passed through the temperature range of from −10° C. to 3° C. as smoothly as possible. From this viewpoint, the combined application of the irradiation with microwaves and the irradiation with far infrared rays is preferred.

The apparatus of the present invention will now be described with reference to the accompanying drawing. FIG. 1 is a schematic diagram illustrating an embodiment of the thawing apparatus, which comprises a thawing chamber 1, far infrared ray heaters 2, and microwave radiator devices 3 which are used in combination with the far infrared ray heaters 2 according to need. Frozen foods 4 to be thawed are placed on a plate 6 located on a bottom plate 5. A lower heater 7 may be disposed on the lower side of the bottom plate 5. A cold air device 8 is arranged in the thawing chamber 1. Preferably the temperature of cold air from the cold air device is varied from −30° C. to 5° C. Where microwaves are applied in combination with far infrared rays, the irradiation with microwaves is switched to the irradiation with far infrared rays at a cold air temperature of, for example, about −5° C. Since thawing times of frozen foods can be empirically known according to the kinds of frozen foods, this changeover can be performed by an automatic timer. Cold air from the cold air device is caused to flow in one direction or can be circulated.

The present invention will now be described in detail with reference to the following examples.

EXAMPLE

Frozen tuna slices maintained at −20° C. were used as the food to be thawed. Since the change of the quality in frozen tuna slices by thawing is more conspicuous than in other frozen foods, frozen tuna slices are very useful for evaluating the superiority or inferiority of the thawing process. Note, the frozen tuna slices used had a weight of about 250 g and a thickness of about 20 mm.

For the thawing operation, the frozen tuna slices were placed in the thawing chamber 1 shown in FIG. 1, but the microwave radiator device was not operated. The far infrared heater 2 was a ceramic-plasma-sprayed plate-shaped far infrared ray heater having a size of 200 mm×300 mm, and the surface temperature of the heater was controlled to 200° C. at an average electric power of 290 W. The frozen tuna slices were placed on the plate 6 and heated from below by the electric heating wire heater 7 at 30 W. To control the surface temperature of the frozen tuna slices, the temperature of cold air from the cold air device 8 was adjusted to a level shown in Table 1. The surface temperature and interior temperature of the tuna slices were measured, and the results are shown in Table 1.

COMPARATIVE EXAMPLE

The thawing test was carried out in the same manner as described in the Example except that the cold air device was not operated and the temperature of the far infrared ray heater was adjusted to a constant level of 130° C. at an average electric power of 150 W. The results are shown in Table 1.

TABLE 1

| | | Example | | | Comparative Example | | |
|---|---|---|---|---|---|---|---|
| Elapsing time | (min) | 0 | 15 | 30 | 0 | 15 | 30 |
| Cold air temperature | (°C.) | −18 | −3 | 5 | — | — | — |
| Top side surface temperature | (°C.) | −18.5 | 1.2 | 6.3 | −6.0 | 10.3 | 16.2 |
| Center portion temperature | (°C.) | −19.1 | −5.0 | −0.8 | −14.7 | −2.8 | −0.9 |
| | | — | Hard as a whole | Easily cut, good hue | — | Icy as a whole and difficult to cut by kitchen knife | Deformed and peripheral portion blackened |
| Upper far-infrared ray heater | | | | | | | |
| Temperature | (°C.) | | 290 | | | 150 | |
| Load | (W) | | 200 | | | 130 | |
| Lower heater load | (W) | | 30 | | | 30 | |

As seen from the results shown in Table 1, in the Comparative Example, if the thawing was carried out for about 15 minutes, the tentatively intended surface temperature of about 10° C. could be obtained, but the temperature of the central portion was still −3° C. and the tuna slices as a whole were as hard as ice. If the irradiation was conducted for 30 minutes, the tuna slices were thawed, but the freshness and sharp red color were lost, and the thawed tuna slices were not suitable for eating. In contrast, in the Example, after 30 minutes, the surface temperature was very low and the thawing was sufficiently advanced, the color and taste were good, and the thawed tuna slices were satisfactorily edible.

According to the thawing process and apparatus of the present invention, even if the temperature of the far infrared ray heater is maintained at a relatively high level, a frozen food can be uniformly thawed while maintaining the freshness thereof without a degradation of the taste and flavor of the food, and the quality of the thawed food can be improved.

I claim:

1. A process for thawing frozen food, which comprises the steps of:
   irradiating said frozen food with microwaves until the surface temperature of said frozen food reaches a temperature of about −5° to 0° C.;
   irradiating said frozen food with far infrared rays while simultaneously maintaining the surface temperature of said frozen food at not higher than about 10° C. with cold air having a temperature of about −30° C. to 5° C.

2. The process as claimed in claim 1, wherein while irradiating with far infrared radiation the surface of said frozen food is maintained at a temperature of about 6° C.

3. The process of claim 2, wherein while irradiating with microwaves cold air is supplied to said frozen food.

4. The process of claim 1, wherein while irradiating with microwaves cold air is supplied to said frozen food.

5. An apparatus for thawing frozen food which comprises:
   a thawing chamber having an interior for containing said frozen food;
   a microwave irradiation device positioned to irradiate said frozen food when said frozen food is placed in said interior of said thawing chamber;
   a far infrared ray heater positioned to irradiate said frozen food after said microwave irradiating when said frozen food is placed in said interior of said thawing chamber;
   a cold air source connected to said interior of said thawing chamber which produces cold air having a temperature of about −30° C. to 5° C.; and
   control means for controlling said microwave irradiation device, said far infrared heater and said cold air source to initially activate said microwave irradiation device to irradiate frozen food until the surface temperature thereof reaches a temperature of about −5° to 0° C. and then simultaneously activates said far infrared heater to irradiate said frozen food with far infrared rays and activates said cold air source to maintain the surface temperature of said frozen food at a temperature not higher than about 10° C.

6. The apparatus of claim 5, wherein said control means operates said cold air source to maintain the surface temperature of said frozen food at not higher than about 6° C. while irradiating with far infrared rays.

7. The apparatus of claim 6, wherein said control means operates said cold air source to produce cold air which is supplied to said frozen food while irradiating with microwaves.

* * * * *